United States Patent [19]

Coyner et al.

[11] 4,038,239
[45] * July 26, 1977

[54] MOISTURE CURABLE POLYURETHANE SYSTEMS

[75] Inventors: Robert N. Coyner, Hopkins; Peter Skujins, Minneapolis, both of Minn.

[73] Assignee: ConTech Inc., Minneapolis, Minn.

[*] Notice: The portion of the term of this patent subsequent to Nov. 11, 1992, has been disclaimed.

[21] Appl. No.: 605,910

[22] Filed: Aug. 19, 1975

Related U.S. Application Data

[63] Continuation-in-part of Ser. No. 418,192, Nov. 23, 1973, Pat. No. 3,919,173.

[51] Int. Cl.$^2$ .............................................. C08G 18/70
[52] U.S. Cl. .................... 260/33.6 UB; 260/77.5 AA; 260/77.5 AT
[58] Field of Search ............... 260/77.5 AA, 77.5 AT, 260/33.6 UB

[56] References Cited

U.S. PATENT DOCUMENTS

| | | | |
|---|---|---|---|
| 2,830,037 | 4/1958 | Carter | 260/77.5 AT |
| 3,192,186 | 6/1965 | Muller et al. | 260/77.5 AT |
| 3,351,573 | 11/1967 | Skreckoski | 260/18 TN |
| 3,352,830 | 11/1967 | Schmidt et al. | 260/77.5 AT |
| 3,425,973 | 2/1969 | Shaw | 260/18 TN |
| 3,463,748 | 8/1969 | Scheibelhoffer | 260/18 TN |
| 3,479,325 | 11/1969 | Blomeyer et al. | 260/77.5 AA |
| 3,549,569 | 12/1970 | Farah et al. | 260/18 TN |
| 3,554,962 | 1/1971 | Fischer | 260/45.8 R |
| 3,652,508 | 3/1972 | Segun et al. | 260/77.5 AA |
| 3,663,514 | 5/1972 | Campbell et al. | 260/77.5 AT |

OTHER PUBLICATIONS

"Veba-Chemie, A.G. Diisocyanates," Bulletin No. 22-E-471-1-4.

Primary Examiner—M. J. Welsh
Attorney, Agent, or Firm—Thomas M. Meshbesher

[57] ABSTRACT

The disclosed process for making a high % solids, one-part, curable, essentially flowable or pumpable, high equivalent weight polyurethane (i.e., polyol-polyisocyanate adduct) prepolymer composition involves de-watering the polyol component of the reaction mixture with an alkaline earth metal oxide, preferably calcium oxide; adding the minimum acceptable level of catalyst for the NCO/polyol reaction; exothermically reacting a partially hindered aliphatic polyisocyanate such as isophorone diisocyanate (IPDI) and a partially hindered aromatic polyisocyanate such as 2,4-tolylene diisocyanate seriatim, so that at least about one-fourth of the IPDI reacts before the 2,4-TDI is added; and then adding more catalyst for the curing (e.g. moisture cure) reaction. Careful control over the amounts and selection of raw materials, proper selection of sequences of addition of these amounts and materials, careful de-watering of the reaction mixture, and proper adjustment or selection of isocyanate functionality minimizes random and undesired reactions and side reactions (e.g. chain extension) during prepolymer formation and insures good elastomeric properties in the ultimately cured product. As a result, this well-controlled prepolymer composition can be made efficiently with simple mixing equipment. One of the preferred coating or sealant uses for the prepolymer product is cured elastomeric coatings for the building industry, e.g. as a primary seal in roofing.

10 Claims, No Drawings

MOISTURE CURABLE POLYURETHANE SYSTEMS

CROSS-REFERENCE TO RELATED APPLICATION

This application is a continuation-in-part of our copending application, Ser. No. 418,192, filed Nov. 23, 1973 now U.S. Pat. No. 3,919,173, granted Nov. 11, 1975.

FIELD OF THE INVENTION

This invention relates to one-part, curable polyetherurethane prepolymer compositions, methods for making them, methods for using them and moisture cured elastomeric coatings derived from them. An aspect of this invention relates to a one-part moisture curable polyurethane system which is particularly useful in the construction industry, e.g. for providing a reasonably thick, water resistant, flexible coating on roof decks. Still another aspect of this invention relates to a method for making an elastomer-forming, moisture-curable, one-part polyetherurethane prepolymer system which is at least 90% or 95% by weight solids and which is made from a polyol and a combination of aliphatic and aromatic polyisocyanates at normal ambient temperatures using relatively simple equipment. Still another aspect of this invention relates to a polyurethane prepolymer system of the type described previously which is an anhydrous, pourable, viscosity-stable liquid at room temperature, which is adequately protected from contamination by atmospheric moisture prior to cure, and which cures to an essentially color-stable elastomer.

DESCRIPTION OF THE PRIOR ART

The art of one-part, elastomer-forming, moisture-curable polyurethane prepolymers has grown enormously in the past several years and is now almost too vast to describe in detail without a lengthy treatise. The advantages and disadvantages of these systems are well known; nevertheless, a considerable amount of potential for these systems has not yet been fully realized. For example, the roof decks of residential and industrial buildings are still generally covered with the time-honored, conventional laminar roofing materials. These materials are inexpensive and generally quite adequate, but they lack the high-elongation properties of an elastomer. Theoretically, an elastomer-coated roof deck (and other uses in the construction industry of elastomeric coatings) could have a number of outstanding advantages (e.g. weatherability, flexibility, water resistance, and ease of application) over conventional materials, and butyl rubber has already been suggested for use as a primary seal for roof decks and as a top coat for existing roofs. To realize these advantages, it is important to be able to manufacture the elastomer-forming material as efficiently and simply as possible, so that competition with the existing materials can become commercially practical.

Polyurethane prepolymers can be made with relatively simple equipment (e.g. on a laboratory scale) or large, complex installations equipped with sophisticated equipment such as solvent recovery systems, azeotropic distillation systems, volatile isocyanate strippers, heated mixers, and the like. The use of simple equipment which does not depend on these sophisticated devices or systems is desirable for several reasons.

To obviate the need for the sophisticated features of the large, complex installations and to provide a relatively simple prepolymer manufacturing process, it is necessary to confront a whole series of problems almost all at once. First, liquid water or water vapor is a serious contaminant during virtually all stages of production of the prepolymer product. Water as a contaminant can enter into the process from several sources, including ambient moisture (atmospheric water vapor, etc.), residual water and water of hydration in raw materials such as polyols, inorganic pigments or filters, and the like. Azeotropic distillation is commonly used to remove water from polyols but is energy-consuming and can involve expensive equipment. A variety of desiccants are known to be effective in removing water from reaction mixtures; however, some desiccants remove the water by a reversible mechanism which provides a latent future source of moisture and others can undesirably alter the chemical characteristics of the resulting product or the reaction conditions used to make it. Furthermore, it may still be necessary to protect the desiccated product with inert, dry gases or the like until it is packaged in moisture-proof containers.

Second, the isocyanate/active-hydrogen (e.g. NCO-/OH) reaction can be rather poorly controlled, at least from a theoretical standpoint. Even assuming that side reactions with moisture or other contaminants can be eliminated, the product of the reaction is often times only a statistical average of a wide range of possibilities. For example, the reaction between six equivalents of isocyanate and one mole of triol produces, on the average a tri-isocyanate. Nevertheless, the polyol may have reacted with the NCO at 0, 1, 2, or 3 of its reactive sites, leaving some unreacted isocyanate, which balances out the NCO/OH ratio statistically but does not add to the amount of useful prepolymer. Various combinations of heat, catalysts, prepolymer-forming raw materials, and incremental addition techniques (e.g. adding the catalyst in two increments) have been used to improve the prepolymer-forming reactions and reduce the expense of "wasted" reactants (e.g. unreacted polyisocyanate). However, the use of heat is not desirable if the goal is manufacturing the prepolymer with simple mixing equipment. The relatively slow reaction between polyisocyanates and polyo (particularly those containing secondary hydroxyl groups) can be speeded up with catalysts. However, most catalysts speed up virtually all NCO/active-hydrogen reactions in both directions and may even increase the possibility of random results.

Further difficulties result from the fact that the one-part moisture-curable system may have to be custom made for a particular use and a particular set of elastomeric properties such as ultimate tensile strength, modulus at 100% elongation, elongation at break, moisture resistance, color-stability (e.g. resistance to yellowing), cell structure (if a foamed elastomer is desired), and the like. Furthermore, it is often necessary to maintain the viscosity of the prepolymer system within very narrow limits prior to cure. If a high % elongation with adequate tensile strength is desired, it may be necessary or desirable to use a high equivalent weight polyol to make the prepolymer. In this event, the viscosity of the resulting prepolymer can be extremely sensitive to minor amounts of active-hydrogen-containing contaminants.

It is known that aliphatic polyisocyanates and combinations of aliphatic and aromatic polyisocyanates (as opposed to 100% aromatic polyisocyanate-capped prepolymers) contribute to light stability, particularly ultraviolet stability, in the cured urethane polymer. It is also known that, in some polyisocyanates, the NCO radicals differ in their reactivity with polyols, and that this phenomenon can sometimes be utilized to reduce randomness in the prepolymer-forming reactions. However, any time a prepolymer-forming system is formulated with regard to one set of considerations (such as uv stability), some other set of considerations (such as the desired properties of the cured polymer, the speed of cure, the depth of cure in a film, etc.) may be compromised. This is why the urethane chemist must confront virtually all the problems at the same time, and no overall solution can be arrived at through a single, straightforward manipulation of the raw materials or reaction conditions.

Accordingly, this invention does seek to confront all these problems without resorting to sophisticated equipment or complex techniques which would make competition with existing non-urethane materials impractical.

SUMMARY OF THE INVENTION

Briefly, this invention involves: (1) utilizing an alkaline earth metal oxide (preferably calcium oxide) as a desiccant for the polyoxyalkylene polyol component of the prepolymer-forming system and for the resulting reaction mixture and the prepolymer product; (2) using the minimum amount of catalyst (e.g. one of the conventional organo-tin compounds) to make the prepolymer, whereby the major amount of catalyst for the curing (e.g. moisture curing) reaction is added after the prepolymer is formed; (3) exothermically reacting, without the addition of heat, an aliphatic and aromatic polyisocyanate with the desiccated polyol, whereby both types of polyisocyanate are characterized by NCO radicals of unequal reactivity and the aromatic isocyanate is preferably not added to the reaction mixture until at least 25% of the number of equivalents of aliphatic isocyanate have reacted with the polyol; and (4) providing a functionality for the resulting prepolymer product which is preferably greater than 2.0 but less than 3.0, an NCO equivalent weight in excess of 1,000 and preferably high % solids, without increasing the viscosity so as to interfere with pumping or casting at normal ambient temperatures. It has been found that, with proper use of the alkaline earth metal oxide desiccant, proper incremental addition of the catalyst for the NCO/OH and NCO/water reactions, seriatim addition (in appropriate amounts and sequences) of certain aliphatic and aromatic polyisocyanates, and proper selection of the polyol, randomness of the prepolymer-forming reactions can be minimized, energy input requirements can be reduced or eliminated, simple equipment can be used, side reactions with moisture and stripping of unreacted isocyanate can be avoided, and adequate control over the viscosity of the prepolymer product can be obtained. Furthermore, the prepolymer product can then be capable of moisture curing to a color-stable elastomer with the desired properties. The elastomer can be cellular, if desired, but is preferably non-cellular for most of the uses contemplated for this invention. Cure (e.g. moisture cure rates) are reasonably rapid to a depth of 10 mils (0.3mm) or more, e.g. up to 65 mils (1.6mm). A coating, moisture cured according to the teachings of this invention and tested separate from its substrate, exhibits good solid elastomeric properties, e.g. a tensile strength at break greater than 25 p.s.i. (1.75 kg/cm$^2$) and an elongation at break greater than 200%. Typically, these cured elastomers have an ultimate tensile strength in excess of 100 p.s.i. and an elongation at break in excess of 500%. The prepolymer systems provided according to the teachings of this invention are particularly useful for coating roof decks and provide an unusually weather-resistant durable roofing material.

DEFINITIONS

As used in this application, the below-listed terms have the following meanings:

1. "Active hydrogen" is considered to be defined according to the Zerwitinoff test described in J. Amer. Chem. Soc. 49 3181 (1927). A typical example of an "active hydrogen" atom is the hydrogen in the hydroxyl radicals of mono- or poly- functional alcohols. As is known in the art, a wide variety of other substituents such as mercaptans, amines, and acids (e.g. carboxylic acids) contain "active hydrogen."

2. "Aromatic polyisocyanate" refers to mono- or polycyclic aromatic compounds wherein the NCO radicals are substituted directly on one or more aromatic rings. Compounds wherein the NCO is "insulated" from the aromatic ring by a methylene or higher alkylene group are not considered "aromatic polyisocyanates".

3. "Aliphatic polyisocyanates" include the alicyclic and cycloaliphatic polyisocyanates wherein the NCO radicals are directly substituted on an alicyclic aliphatic or cycloaliphatic radical or nucleus, even though the compound may also contain aromatic groups.

4. "TDI" refers to tolylene diisocyanate, sometimes called toluene diisocyanate. Isomers of tolylene diisocanate are indicated thus: "2, 4-TDI", "2, 6-TDI", etc.

5. "IPDI" refers to isophorone diisocyanate, also known as 3-isocyanatomethyl-3, 5, 5-trimethylcyclohexyl isocyanate.

6. "Percent solids" is a term borrowed from paint chemistry and polyester resin coating technology. The term refers to the amount of material (be it solid or liquid) remaining after volatile materials or materials not participating in the curing of the composition are removed. Thus, for example, a moisture-curable polyurethane prepolymer composition which was 85% prepolymer, 5% pigment, and 10% organic solvent or inert organic liquid diluent would be characterized as a "90% solids" composition, since the solvent or diluent would evaporte from the prepolymer during a curing step and/or would not participate in the curing reactions.

7. The term "elastomer" (hence the term "elastomeric") is intended to incorporate by reference the definition used by the American Society for Testing and Materials (A.S.T.M). "Elastomeric" behavior and properties such as tensile strength, % elongtion, and 100% modulus can be measured with standard tensile testers (e.g. the "Instron") in accordance with known procedures.

DETAILED DESCRIPTION

As will be clear from the foregoing disclosure, this invention involves careful selection of prepolymer-forming materials and process conditions or steps. The raw materials for the process will be described in detail first.

POLYOLS

The polyols used to make polyurethane prepolymers of this invention are preferably of the polyether, i.e., polyoxyalkylene, type. That is, the polyol should contain at least one polyoxyalkylene chain having several (e.g. more than 10 or 20 oxyalkylene units. Polyether polyols which also contain polyester or polythioether units or the like can be used, so long as the ultimate desired properties for the prepolymer and the cured elastomer are obtained. Polyester polyols are ordinarily not preferred due to the relatively higher stiffness of polyesterurethane elastomers, particularly at low temperatures. (The polyetherurethanes are generally outstanding in terms of low temperature flexibility properties.)

Polyoxyalkylene polyols are commercially available and are made in a well known manner from alkylene oxides and/or tetrahydrofuran through polymerization, starting with an initial skeleton or nucleus, which is typically an alcohol or amine of any desired functionality, e.g. propylene glycol, ethylene glycol, trimethylol propane, glycerin, pentaerithritol, ethylene diamine, etc. The most readily available polyether polyols are made up of oxyalkylene units containing two, three, or four carbon atoms, e.g. oxyethylene, oxypropylene (both 1, 2- and 1, 3-, the 1,2- being more common), and oxybutylene, including both tetramethylene oxide and 1,2- butylene oxide. As is well known in the art, primary alcohol groups react more rapidly with NCO than secondary alcohol groups; however, urethanes derived from NCO reactions with secondary alcohols tend to be somewhat more resistant to degradation (e.g. hydrolytic attack), and the polyoxypropylene glycols tend to be more resistant to bacterial attack.

The molecular weight, equivalent weight, and functionality of the polyol should be selected so as to provide a polyurethane prepolymer with a manageable viscosity and a polyurethane elastomeric moisture-cured product with adequate tensile strength and elongation properties. For example, a polyether polyol with a molecular weight of 10,000 or higher results in an NCO-terminated prepolymer which has an excessive viscosity at room temperature and is not particularly well-suited to the process of this invention. Accordingly, a triol with an equivalent weight higher than 3,300, a diol with an equivalent weight higher than 5,000, or a tetrol with an equivalent weight higher than 2,000 can be somewhat difficult to work with. On the other hand, the isocyanate equivalent weight of the resulting prepolymer should be at least about 1,000 (e.g. 1,500 – 2,000) to provide adequate elastomeric properties in the cured product.

It can be an oversimplification to describe the polyol used in this invention as a "diol", "triol", or "tetrol". It would be more accurate to refer to a polyol component which can be a mixture of polyols having an average functionality greater than 2 but, typically, less than 4 and preferably no greater than about 3. Thus, the polyol component can be a mixture of a diol and a triol. It can also be a triol which has been partially capped with an agent monofunctional with respect to reactive hydroxyl groups, e.g. a monoisocyanate, a carboxylic acid anhydride or chloride, an alkoxide-forming compound, or the like, which can provide a small percentage of terminal monourethanes, monoethers, monoesters, etc. for lowering the functionality of the polyol slightly below 3.0 or even as low as 2.5. In the manufacture of some very high molecular weight polyols, conditions favoring the formation of some terminal ether (i.e., alkoxy) groups can be provided, obviating the need for a specific capping step.

As will be explained subsequently, one technique used in this invention is to reduce the functionality of the polyurethane prepolymer with a monofunctional alcohol, so that a s commercially available polyether triol or the like can be used as a staring material for the prepolymer.

Although it is permissable to include incidental amounts of low molecular weight polyol or polyamine chain extenders and cross linkers in the reaction mixture which produces the prepolymer, this techniques is not preferred for the practice of this invention. the preferred practice is to use an essentially polyether triol component having an equivalent weight within the range of 1,000 – 3,000 or, less preferably, a mixture of a triol and a diol, e.g. a triol of molecular weight 4,500 mixed with a diol of molecular weight 4,000. Excellent results can be obtained with triol alonge, e.g. "Pluracol" 380 (trademark of Wyandotte). The amount of polyol component should be selected so as to provide an NCO-/OH ratio in the prepolymer-forming mixture which is preferably greater than about 1.8:1 but less than 3:1. In view of the need to minimize random reactions in the prepolymer-forming reaction mixture, there is generally no advantage in going much below 2:1 or much above 2.5:1 in NCO/OH ratio. However, a slight excess over 2:1, e.g. 2.04:1 to 2.25:1 can be useful.

DEWATERING AGENTS AND FILLERS

The desiccant for the polyol and the resulting polyurethan prepolymer is, in the context of this invention, more accurately described as a "de-watering agent". The preferred de-watering agent is calcium oxide, which is white in color and forms a hydroxide which is also white in color. This oxide does not merely take up water or form a hydrate salt; it actually scavenges water through the "slaking" reaction, which reults in the formation of a hydroxide which is termally stable up to about 580° C. and, exept for some acceleration of curing, behaves substantially as an inert filler in polyurethane prepolymer systems. The "slaked" de-watering agent will thus not ordinarily release chemically bound water through reversal of the slaking reaction. The calcium oxide de-watering agent effectiverly scavenges water not only from the polyol but also from water of hydration of physically bound water contained in fillers, extenders, pigments, and hygroscopic catalysts included in the prepolymer composition. To a small extent, the de-watering agent helps to protect the prepolymer composition against premature gelation due to contamination with atmospheric moisture; however, the preferred technique for protection against moisture contamination will be described subsequently.

An important advantage of calcium oxide is that it appears to provide fast, effective water scavenging within a level of alkalinity which contributes to the alkaline environment desired for rapid moisture cure of the prepolymer, without contributing to degradative side reactions or the like. As is known in the art, calcium oxide can be used to de-water a variety of organic compounds, including amines used in two-part polyurethane systems. See U.S. Pat. No. 3,463,748. Due to its white color (about as white as calcium carbonate), calcium oxide has been used as a pigment (e.g. a tack-reducing pigment) in urethane systems; see, for example, U.S.

Pat. No. 3,975,926, column 5, line 33. However, each urethane system (e.g. one-part vs. two-part, amine cure vs. moisture cure, etc.) presents different formulating considerations with respect to cure rate, side affects in the presence of catalysts, curing mechanisms, etc. It has been observed that basic materials (including fillers or catalysts) added to the urethane system can sometimes result in discoloration of the final cured product and other undesirable effects. For example, it has been observed that sodium hydroxide, barium oxide or hydroxide, and even high-pH calcium carbonate fillers can cause yellowing.

Oxides of other alkaline earth metals are technically capable of water uptake but are also capable of forming thermally decomposable hydrate salts such as strontium hydroxide octahydrate. Alkaline earth oxides outside the Group IIA atomic weight range of 40 to 138 are not considered to have suitable water scavenging properties. In the context of this invention, CaO is chemically unique as compared to other calcium salts, other alkaline earth metal oxides, the alkali metal oxides, and the Group IIB and IIIA metal oxides.

Any of the conventional fillers, extenders, and pigments, both organic and inorganic, which are essentially inert toward isocyanate radicals or active hydrogen-containing substituents can be used in this invention. Even those fillers, extenders, and pigments which contain some water (e.g. loosely bound water of hydration) can also be used, since the de-watering agent will scavenge this water before it has an opportunity to react with the polyisocyanate component of the prepolymer-forming reaction mixture. Thus, inorganic salt or oxide fillers and extenders need not be excluded merely because they contain some water of hydration or physically bound water. The preferred filler is neutral (as opposed to high-pH) calcium carbonate (e.g. ground limestone) and the preferred white pigment is titanium dioxide, but clay, alumina, barium sulfate, calcium sulfate, and other substantially water insoluble salts, oxides, and silicates can be used.

Among the other conventional additives or fillers which can be included are flame retardants. A flame retardant which is stable at ordinary temperatures but becomes effective in the range of about 600°-700° F. (about 300°-375° C.) is useful in this invention. In this regard, alumina trihydrate is generally preferred, since it releases water of hydration in the desired temperature range and is quite stable at normal ambient or moderately elevated temperatures. There is little or no risk that the water of hydration in the alumina trihydrate will be prematurely released or available for reaction with free isocyanate groups. There can be some surface moisture of the alumina trihydrate particles, but the de-watering agent (e.g. CaO) can scavenge this moisture.

Other inorganic and/or inexpensive organic extenders such as powdered scrap rubber (natural or synthetic), and other readily available, substantially inert materials of this type can be useful. Both white and colored pigments can be used alone and in combination.

All de-watering agents, fillers, pigments, and extenders useful in this invention are ordinarily available in particulate form, e.g. at least -12 mesh (U.S. or Tyler) and even down to -325 mesh (as in the case of titanium dioxide, clay, and precipitated materials such as precipitated calcium carbonate).

The de-watering agent should be used in excess of the amount needed to scavenge all the water present in the prepolymer-forming reactants. For example, the polyol component typically contains less than 0.1% by weight of water, and the amount of water contained in calcium carbonate and titanium dioxide is ordinarily no larger and may even be less. Assuming a stoichiometric amount of about 3 parts by weight of calcium oxide per part by weight of water, the excess over stoichiometric for the calcium oxide can easily be 50 or 100% with no substantial risk of undesired side reactions, discoloration, degradation of the cured polymer, etc. In fact, for efficient de-watering, it is preferred to use at least 3-100 times stoichiometry based on the amount of water present in the prepolymer-forming composition. There does not appear to be any advantage in using more than 1,000 times stoichiometry, however.

POLYISOCYANATES

The present invention makes use of the properties of aliphatic and aromatic polyfunctional isocyanates, preferably diisocyanates. For any polyisocyanate molecule used in this invention, it is preferred that at least one of the two or three isocyanate radicals linked to the molecule be substantially kinetically more reactive with respect to active hydrogen than any other free isocyanate radical on the same molecule. Such differences in reaction rate between NCO radicals can most easily be provided by having one substantially unhindered isocyanate radical on the molecule, the other isocyanate radicals being sterically hindered by a neighboring substitutent or the like. Other techniques for providing differences in reactivity are known. For example, it is possible to react one equivalent of isocyanate with an unstable blocking group (e.g. by using phenol as the reversible capping agent), but ordinarily this technique does not provide as high a level of control over results. Another approach, described in U.S. Pat. No. 3,663,514, is to partially hydrogenate a bicyclic aromatic diisocyanate, so that one of the two aromatic rings is converted to a cycloaliphatic nucleus. However, it is unnecessary to use this highly sophisticated type of hybrid molecule. Commerically available aromatic and aliphatic diisocyanates, properly used in accordance with the teachings of this invention, appear to provide all the desired advantages of low cost, simple ambient temperature batch or continuous processing, minimal random or undesired reactions (e.g. minimal chain-extension) during prepolymer formation, low viscosity in the resulting prepolymer-containing product, dependable and rapid moisture cure of this prepolymer product, and a variety of desired properties in the moisture-cured material, including color stability, stable elastomeric properties well suited for roofing material, and non-chalking of pigments after outdoor exposure.

With the exception of pigment and color stability (e.g. resistance to chalking and ultraviolet-induced degradation), many of these properties can be obtained and even maximized by using as much aromatic diisocyanate as possible. However, if the ratio of aromatic NCO equivalents to aliphatic NCO equivalents exceeds about 7:1, the risk of color instability in the moisture cured urethane polymer can be significant. Accordingly, this ratio of aromatic NCO/aliphatic NCO is preferably 6:1 or less. With respect to the elastomeric properties of the cured urethane, it is preferred that the aromatic NCO/aliphatic NCO ratio be at least 1:1, preferably 2:1 or more. At the present time, there is also a cost advantage in minimizing the amount of aliphatic diisocyanate used to make the prepolymer.

The aliphatic polyisocyanate used in this invention can contain two or three free NCO radicals, the best results being obtained with aliphatic diisocyanates. It is preferred that at least one of the free NCO's of the aliphatic diisocyanate be hindered by its position on a cycloaliphatic ring structure or by a neighboring substituent such as an alkyl group. Thus, an alicyclic aliphatic diisocyanate such as an alkylene diisocyanate is suitable for use in this invention, if the alkylene chain is appropriately substituted with methyl or ethyl groups or the like. An example of such a compound is trimethylhexamethylene diisocyanate. An even more preferred approach is to use a cycloaliphatic diisocyanate such as "IPDI" (see the foregoing definitions). The compound IPDI is presently available on a commercial scale at 99.0 weight % minimum purity. The low viscosity and low vapor pressure of this compound are advantageous from a handling and toxicity standpoint.

Aliphatic diisocyanate molecules wherein both NCO's are substantially indistinguishable in their rate of reaction with active hydrogen (e.g. hexamethylene diisocyanate or fully hydrogenated diphenylmethane diisocyanate) are generally unsuitable for making prepolymers of this invention and are preferably not used in greater than incidental amounts.

The considerations which apply to the aromatic diisocyanate are analogous to those relating to the aliphatic diisocyanates. Steric hindrance caused by a substitutent of the aromatic ring is the preferred approach for obtaining the difference in reactivity between the NCO's. Again, both diisocyanates and triisocyanates can be operative, but diisocyanates are greatly preferred. The aromatic polyisocyanates can contain 1, 2, or 3 aromatic rings, the mono- and bi-cyclic aromatics being preferred.

As is known in the art, compounds such as 2, 6-TDI (see the preceding definitions) and diphenylmethane diisocyanate are characterized by, among other things, isocyanate radicals of substantially equal rates of reactivity with active hydrogen. Commercially available "TDI" typically contains a substantial amount of this 2,6-isomer, which is not preferred for use in this invention. It is therefore preferred that the 2,4- and 2,6-isomers be separated to obtain substantially pure 2,4-TDI. In the 2,4-isomer, the 2-isocyanate radical is significantly hindered by the methyl group of the toluene nucleus, as compared to the 4-isocyanate, which is relatively unhindered. Presently, 2,4-TDI is commercially available as a substantially pure isomer free of greater-than-incidental amounts of the 2,6-isomer (e.g. as made by the duPont Company under the trademark "Hylene-T"). It is this separated 2,4-isomer which is preferred for use in this invention, despite its higher cost.

CATALYSTS

A wide variety of materials are known to speed up the reaction between isocyanate radicals and active hydrogen. Some of these catalysts indiscriminantly speed up the reaction between NCO and any source of active hydrogen, including water, alcohols, mercaptans, amines, acids, and even amides. Others such as mercuric acetate and phenylmercuric acetate tend to be selective and favor the NCO/alcohol or amine reaction over the NCO/water reaction. Broadly speaking, almost any basic substance (particularly a material with an unbonded electron pair) may have an accelerating effect on the isocyanate/active hydrogen reaction. Thus, the alkaline earth metal oxide de-watering agent does accelerate the prepolymer-forming reactions to some extent. This accelerating effect is relatively weak compared with the preferred conventional catalyst, however.

For the purposes of this invention, the conventional catalysts can be grouped into three broad categories: metallic salts, organo-metallic compounds, and organic bases. The metallic salt catalysts are typically salts of tin, lead, mercury, or Group VIII metals such as iron. The organo-metallic compounds, are so-called because they contain at least one direct carbon-to-metal bond. The preferred organo-metallic catalysts are of the organo-tin (IV) or organo-lead type. As is the case of the metal salt catalysts, compounds containing mercury or Group VIII elements are also operative, provided that the organo-mercuries are used for prepolymer formation and not catalysts of the moisture cure.

A particularly preferred type of catalyst has the formula $R_2Sn(OCOR')_2$, wherein R and R' are organic (preferably aliphatic) groups. One such compound, dibutyl tin dilaurate is readily available and is commonly abbreviated DBTDL. These organo-tin compounds accelerate both the NCO/OH and NCO/water reactions and will thus do double duty in the context of the present invention. That is, the organo-tin catalyst can be added to the prepolymer-forming mixture to accelerate the formation of urethane linkages from OH's and NCO's and will also serve to accelerate the moisture cure of the prepolymer-containing product. (Although there is some debate about the exact mechanism of a moisture cure, terminal NCO groups are apparently converter by water to primary amines which react with other NCO's to yield urea linkages.)

It is generally not preferred to use organic bases such as tertiary amines for the prepolymer-forming reactions of this invention. The tertiary amines are, however, very useful additives to the prepolymer-containing product, since they are very effective in accelerating the isocyanate/water reaction.

As is known in the art, the combination of an organo-tin catalyst with a tertiary amine catalyst is an extremely efficient system for speeding up the moisture cure of a one-part urethane system. Theoretical studies have shown that one of the most effective tertiary amines for this combination of catalysts is commonly referred to as triethylene diamine, also known as 1, 4-diaza (2, 2, 2) -bicyclo-octane.

Many other tertiary amines are suitable for use in this invention, including the trialkylamines (e.g. triethylamine), N-substituted piperidine, N,N'-substituted piperazine (e.g. dimethylpiperazine) and the aromatic heterocyclic tertiary amines such as pyridine.

As will be explained subsequently, the catalyst of this invention is preferably added in two or more increments. A relatively small increment is added for the prepolymer-forming reactions, and the balance of the catalyst or catalytic system is added to the resulting prepolymer-containing product to speed up the moisture cure when the product is put to use. As will be clear from the foregoing disclosure, it is preferred to use an organo-metallic catalyst alone for the prepolymer-forming reactions and an organo-metallic catalyst in combination with a tertiary amine for the moisture cure. The organo-metallic catalyst added in the different stages of the process can be the same or different. For purposes of convenience of manufacture, a small amount of a catalyst such as DBTDL is added for formation of the prepolymer, and more DBTDL is added later when the prepolymer-forming reactions are substantially complete. The tertiary amine can be added at the same time with this further addition of DBTDL or at any other suitable time after addition of all the polyisocyanates and prior to drumming, canning, bottling, or other packaging of the complete one-part urethane system.

ORGANIC LIQUID DILUENTS AND OTHER INGREDIENTS

It is a preferred feature of this invention that the one-part urethane system is at a high "percent solids" level, e.g. at least 70% solids and preferably at least 80% solids by weight. Thus, the polyols and polyisocyanates used in reaction mixtures of this invention, alone and in combination, should be low enough in viscosity to avoid the need for a major amount of solvent. Similarly, the resulting prepolymer, alone or in combination with the de-watering agent, fillers, and catalysts, should also be low enough in viscosity to be flowable (e.g. pumpable, pourable, or castable) at normal ambient temperatures, with or without significant viscosity adjustments by means of solvent.

It is nevertheless a preferred practice of this invention to add a minor amount (e.g. less than 30%, preferably less than 20% by weight) of organic solvent or organic liquid diluent, not so much to reduce viscosity as to provide the nearly 100% solids one-part urethane system with a measurable vapor pressure under normal ambient conditions of handling, packaging, and storage. The organic liquid diluent is preferably compatible with the one-part system, e.g. a suitable organic solvent for the prepolymer. The diluent, being at least slightly volatile under normal conditions of handling and storage, helps protect against moisture contamination of the one-part urethane system. By adding the liquid diluent initially or at some other convenient stage of the process prior to packaging (drumming, canning, or the like), the use of a dry nitrogen blanket during or just prior to packaging can be avoided.

The preferred organic liquid diluents have a measurable vapor pressure at 20° C. pressure and preferably also a meausrable vapor pressure even at 0° C. This vapor pressure will keep the contents of a drum or other container of one-part urethane under sufficient pressure to prevent atmospheric water vapor from entering the container. Liquids of high volatility are not needed for this purpose, however. Petroleum distillates, coal tar distillates, or other substantially hydrocarbonaceous liquids boiling at higher than 30° C. (e.g. up to 210° C.) under atmospheric pressure can be used to provide the necessary vapor pressure in the on-part urethane system. Typical examples of high flash point, high boiling diluents are mineral spirits, or petroleum naphtha, solvent naphtha, V.M. and P. naphtha, and high boiling aromatics (e.g. xylene), all of which boil at temperatures above 90° C., e.g. up to 175° C., preferably less than 150° C. The distillates with a flash point above 80° F. (27° C.) typically contain paraffins, cycloparffins, and aromatics.

Some of the more polar solvents can also be used, provided they are free of active hydrogen or other functional groups reactive with either active hydrogen or isocyanate. Among these are the halogenated solvents. Ketones are less suitable due to the possiblity of side reactions with the prepolymer-forming reactants.

Other additives or modifiers for the prepolymer composition which can be useful include adhesion promoters, plasticizers, dispersion aids, foaming or cell-control agents (if a foam is desired), de-gassing agents, pH-adjusting agents, and other additives suitable for sealants or elastomeric cotaings or molded articles.

The preferred adhesion promoters are the silane type, e.g. the trialkoxysilanes. As is known in the art, the trialkoxysilane functional group can be included in active-hydrogen containing molecules (e.g. amines) and/or isocyanate-capped molecules (e.g. polyurethane prepolymers). See, for example, U.S. Pat. No. 3,627,722 (Seiter), issued Dec. 14, 1971, column 1, line 73 et seq. The preferred trialkoxysilane groups are trimethoxysilane and triethoxysilane, though higher alkoxides can be used.

ISOCYANATE CAPPING AGENTS

As will be explained subsequently, when the isocyanate functionality of a prepolymer of this invention is about 3.0 or more, this functionality is preferably reduced slightly through reaction with an active hydrogen-containing monofunctional capping agent such as a monofunctional alcohol, a monocarboxylic aicd, a monomercaptan, or a monofunctional secondary amine. The preferred capping agents are the monofunctional aliphatic alcohols, preferably the liquid alcohols (such as lower alkanols) miscible with the prepolymer composition and with the desired tertiary amine catalyst. Thus, the preferred lower alkanols contain 12 carbon atoms or less, e.g. n-butyl alcohol, which is compatible with triethylene diamine, or i-propyl alcohol. The optimum isocyanate functionality of the prepolymer composition (e.g. for a roofing seal coat) is about 2.5 to about 2.8.

The Process

The process of this invention can be carried out on batch, continuous, or semi-continuous basis, depending on the type of raw material metering and conveying equipment, product recovery and packaging arrangement, etc. In its broadest aspect, this process comprises the following steps.

First, an isocyanate-reactive composition is provided. This composition contains the polyol, the de-watering agent, a catalyst (preferably an organo-metallic catalyst for both the NCO/OH and NCO/water reactions), fillers (if desired), any desired modifiers (e.g. de-gassers), pigments (if desired), and a small ammount of inert organic liquid diluent (if desired). This isocyanate-reactive composition should be low enough in viscosity to permit stirring with conventional mixing equipment at normal ambient temperatures. The organic liquid diluent (naphtha, mineral spirits, etc.) does reduce the viscosity slightly, but is ordinarily not essential for viscosity reduction. This isocyanate-reactive, polyol containing composition is mixed or agitated (e.g. for 0.5 – 5 hours, preferably 1 – 2 hours) until the water scavenging reaction is substantially complete. Water scavenging can be carried out at room temperature or at mildly elevated temperatures, if desired (e.g. up to 50° C). The progress of this scavenging or slaking reaction can be monitored with a distillation test and/or a Karl Fischer titration. The isocyanate-reactive composition can be blended in a kettle equipped with a stirrer or in a horizontal churn or mixer.

Second, the aliphatic polyisocyanate is then added to the bone-dry isocyanate-reactive composition. Optionally, the organo-metallic catalyst can be added with the aliphatic polyisocyanate. Preferably, no heat is applied to the resulting reaction mixture, but starting materials and mixtures thereof can be maintained at any convenient, normal in-plant ambient temperature (e.g 15°-45° C.). The essentially adiabatic exotherm produced by the isocyanate-polyol reaction provides sufficient heat to raise the reaction mmixture a few degrees C. The exotherm should be carefully monitored, since it provides a good measure of the amount of "head start" allowed to the aliphatic polyisocyanate before the aromatic polyisocyanate is added. The desired amount of exotherm varies with the equivalent weight of the polyol having an equivalent weight in the range of 1,500 - 2,300 (e.g. 1,700 0 2,000), an exotherm of about 3°- 5° C. indicates that more than 25% of the aliphatic isocyanate equivalents have reacted with the polyol, the theoretical ideal being about 50% for a diisocyanate. An exotherm of, say, 1° or 2° C. would typically indicate too many unreacted equivalents of aliphatic isocyanate, leaving the possibility that the aromatic polyisocyanate, when added, can enter into a random series of ractions including some chain extension of isocyanate-terminated prepolymer molecules. Such chain extension may increase the viscosity of the reaction mixture to an undesired level, but, more important, it results in the conversion of aromatic isocyanate equivalents into undesired urethane linkages. An exotherm in excess of about 5° C. oftentimes indicates too much of a head start for the aliphatic polyisocyanate, which can result in excess viscosity increases due to random reactions.

Third, preferably after at least 25% of the aliphatic isocyanate equivalents (more preferably about 40 - 60%) have reacted, the aromatic polyisocyanate is then added, resulting in a much greater exotherm, which tends to approach a fairly constant temperature, indicating that the isocyanate/polyol reaction is substantially completed. After a total polyol/NCO reaction time of, typically, 3 - 60 minutes and a total exotherm of, for example, 10°- 20° C., the result is an isocyanate-terminated polyurethane prepolymer with a manageable viscosity. In the preferred practice of this invention, the molecular weight of each prepolymer molecule tends to be about equal to the one hydroxyl equivalent weight plus two isocyanate equivalent weights times the functionality of the polyol indicating minimal chain extension and unreacted polyisocyanate.

Fourth, the catalyst for the moisture cure reaction is preferably not added to the reaction mixture until isocyanate/polyol reaction appears to be complete or substantially complete. This is particularly true of tertiary amine catalysts. A preferred practice is to add some organo-tin catalyst (e.g. 0.03-1.0 weight % or about 25 to 80% of the total included in the final prepolymer composition) in the early stages of the process, and the balance with the moisture cure catalyst just prior to packaging. As pointed out previously, the preferred moisture cure catalyst is a combination of a tertiary amine and an organo-metallic catalyst. At this stage of the process, the isocyanate functionality of the prepolymer composition can be reduced slightly with one of the monofunctional capping agents described previously. If the functionality of the system was properly adjusted at some earlier stage, this capping step can be omitted.

Fifth, the prepolymer composition is now at a fairly low viscosity due to the high internal temperature created by the exothermic NCO/active hydrogen reactions. (The capping step, if used, also contributes an exotherm.) It is therefore preferred to package the prepolymer composition while it is still hot and will readily flow into containers, thus speeding up the packaging operation. The organic liquid diluent, added earlier in the process, protects the prepolymer composition from gaseous atmospheric contaminants (e.g. water vapor) during and after packaging. The containers for the prepolymer are provided with a hermetic seal for the contents and are made as moisture tight as possible. An entire batch, from charging of the polyol to the mixer up to this packaging step takes less than 5 hours, e.g. 2 to 3 hours. The sealed containers can be shipped to the job and used in coating or other applications or techniques, including simple pouring, trowelling, casting, spraying, brushing, etc.

A coating or other application of the prepolymer composition cures to a depth of 10-200 mils (e.g. 65 mils) under normal atmospheric temperature and humidity conditions to form an elastomeric layer which, tested separate from its substrate, preferably has a tensile strength at break of 50 - 300 psi and an elongation at break of 500 - 2000%. A tensile strength in excess of 100 psi (e.g. up to 200 psi) and an elongation in excess of 800% (e.g. up to 1500%) is particularly well suited for the primary seal for a roof deck or as a top coat for an existing roof. Asphalt coatings, by comparison, are non-elastomeric and have a relatively negligible elongation at break. Both the coating and curing operations are rapid and efficient. For example, a one-part, moisture-curable prepolymer composition with a viscosity less than 300,000 centipose at 25° C. can be trowelled, pumped and sprayed, cast, or otherwise coated at about 3 - 5 gallons per 100 square feet and will form a firm gel to a depth of 65 mils in 3 - 12 hours, dependingon the ambient conditions.

Although the primary thrust of this invention relates to moisture curing of the prepolymer composition, two-part curable systems can be formulated based on the technology of this invention. For example, the same (or substantially the same) polyol component used to synthesize the prepolymer can, in the free-OH form, be used as the basis of a "Part B" or active hydrogen containing part of a two-part system. As is known in the art, fillers, thixotropes, and the like can be included in the "B" part. One of the uses of such two-part systems is in sealant or caulking compositions.

In the above-described second and third steps of this process, the ideal reaction scheme (assuming, for simplicity of explanation, that the polyol is 100% triol) would be as follows: 1 mole of aliphatic diisocyanate reacts with 1 mole of triol to yield a molecule containing 1 free aliphatic isocyanate radical and 2 free hydroxyl radicals. The aromatic diisocyanate is then added, resulting in the formation of a single-unit prepolymer having a molecular weight equal to the molecular weight of the triol plus the molecular weight of one aliphatic diisocyanate and two aromatic diisocyanates, e.g. a molecular weight of about 5,000 - 9,000, preferably 6,000 - 7,000. When this single unit prepolymer is moisture cured, the aromatic isocyanates theoretically are completely or almost completely converted to urea linkages and are "buried" in the middle of polymer chains and branches. Aromatic-amine termination of polymer chains and branches is rare, hence discoloration under the influence of light is unlikely — most of the amine termination being aliphatic rather than aromatic in character.

Needless to say, this theoretical model is difficult to obtain in practice. Nevertheless, this invention appears to provide a very close approximateion of the theoretical model throughout the disclosed ranges of NCO/OH ratios and aromatic NCO/aliphatic NCO ratios. As pointed out previously, a slight excess over the theoretical 2:1 NCO/OH ratio appears to provide optimum results. Whatever the NCO/OH rato, ordinarily 2/7 to 5/6 NCO equivalents of aliphatic diisocyanate are preferably used, the balance being aromatic diisocyanate. Excellent results have beem obtined with a 2:1 weight ratio of TDI to IPDI which corresponds to approximately a 2.5:1 molar ratio.

The viscosity of resulting prepolymer-containing composition can easily be kept below 800,000 centipoise (cps) at 25° C., (Brookfield HAF Viscometer, spindle No. 5 at 1 rpm) even at 95 – 100% solids. Viscosities of 15,000 –300,000 cps have been obtained in practice, depending on the exact formulations used to make the prepolymer composition. The viscosity of the one-part system appears to be stable indefinitely, so long as the system is protected from contact or contamination with moisture or other sources of active hydrogen.

When the aforementioned capping step is used to adjust the functionality of the resulting isocyanate-terminated prepolymer, it is convenient to add the tertiary amine blended with a lower alkanol capping agent. In this invention, there does not appear to be any difficulty connected with using tertiary amine/organo-metallic moisture cure catalysts.

USES OF THE PREPOLYMER COMPOSITION

Prepolymer compositions of this invention can be coated or molded and cured to form elastomeric coatings or articles, which can be either cellular or non-cellular. To produce a cellular article such as a foamed cushioning material or the like, water can be used as both the curing or foaming agent, or, if desired, a blowing agent such as a fluoroalkane can be used. The high solids, relatively low viscosity character of the prepolymer composition facilitates casting and pouring without entailing the hazards and inconveniences of solvent evaportion or recovery. Although the preferred application of these prepolymer materials is in the field of roofing (both primary seals and top coats) other areas of application include waterproofing, vapor barrier coatings or treatments or seals for the construction industry generally, fabric coating, marine coatings, thermally insulative coatings (particularly when the polymer is foamed), seamless tank linings resistant to water and mild reagents, sealants, molded or coated pre-fabricated panels, and the like. To form stiff, paste-like sealants, or caulks applicable with sealant guns, spatulas or pouring techniques, a relatively low viscosity prepolymer system can be thickened with inert conventional thickening agents (colloidal silica, bentonite, etc.), and ordinarily it will also be desirable to add one of the silane adhesion promoters described previously. Non-cellular coatings preferably range from 1 to 200 mils (0.03–5mm) in thickness, typically 10 – 100 mils (0.3–2.5mm). If a high tensile-strength, low elongation elastomer is desired, (e.g. tensile strength in excess of 250 psi, elongation less than about 400%), a prepolymer with an isocyanate functionality slightly in excess of 3.0 can be used. If a high elongation, low tensile strength polymer is desired, the propolymer functionality can be reduced to 2.0 or slightly higher. As pointed out previously, the preferred properties (e.g. 100 – 200 psi tensile, 800 – 1500% elongation) are considered to be achieved with a prepolymer functionality slightly less than 3.0. Properties of the cured elastomer can be tailored to various needs through, for example, different ratios of aromatic-to-aliphatic polyisocyanate. Aliphatic polyisocyanates can be maximized, for example, when speed of moisture cure and tensile strength are not important. Aromatic diisocyanates can be maximized when color stability and non-chalking are less important than the toughness of the polymer.

In the following examples all parts and percentages are by weight unless otherwise indicated.

EXAMPLE 1

A moisture-curable, low viscosity isocyanate-terminated, filled and pigmented polyetherurethane prepolymer was prepared from the following total composition:

| Component and Description | Parts/Wt. |
|---|---|
| A. "TPE-4542"- (a trifunctional aliphatic polyether polyol of molecular wt. 4500 and containing some primary and some secondary hydroxyl groups. Typical hydroxyl number 37.3 and typical water content 0.04%/wt.) | 17.0124 |
| B. "TP-4020P"- (a difunctional aliphatic polyether polyol of molecular wt. approximately 4000 and containing some non-reactive constituents. Typical hydroxyl number 28.8 and typical water content 0.01%/wt.) | 43.9508 |
| C. Essentially neutral, water ground limestone (calcium carbonate) filler (contains some water), >99% minus 325 mesh (U.S.) | 12.9508 |
| D. White pigment (titanium dioxide) | 3.8773 |
| E. Petroleum naphtha, boiling range 200–300° F. | 0.8598 |
| F. Dibutyl tin dilaurate (catalyst, added in 1 increment) | 0.0538 |
| G. Silicone dispersion aide | 0.0852 |
| H. Phosphate ester plasticizer | 1.7996 |
| I. Calcium oxide | 12.8773 |
| J. 2,4-TDI | 4.3111 |
| K. IPDI (see U.S. Patent 3,549,569) | 2.5734 |
| | 100.3515 |

The procedure for blending these ingredients and forming a propolymer composition was as follows: Components A and B were charged to a horizontal churn, the entire amount of both components A and B being added. The entire amount of components C, D, E, G, H, and I were added to the churn containing components A and B. The entire amount of component F was also added to the resulting mixture; however, the total amount of component F can be brought up to as much as 1.0 or 2.0 parts after the prepolymer has been formed. The mixture of components A through I was continuously mixed for 2 hours at normal ambient temperatures, at which time a distillation-type water determination test indicated that scavenging of the water by the calcium oxide (component I) was complete. Components J and K were then simultaneously added with the mixture initially at room temperature. (As will be shown in Example 2, the preferred procedure is to add component K first.) In less than 35 minutes, the isocyanate-terminated propolymer adduct was formed, as indicated by a leveling off of the temperature rise amounting to 27.5° F. (At this point, additional component F or component F blended with triethylene diamine of N,N'-dimethylpiperazine can be added and the composition can be canned in sealed containers.)

Prior to coating and curing, the prepolymer composition (99.1% solids was found to have a viscosity of 26,000 centipoise at 77° F.

After coating and curing the prepolymer composition, a 65 mil film of the resulting polyurethane elastomer was stripped from the substrate and tested. The following properties were observed:
Ultimate tensile strength (at break) : 150 psi Elongation: 1300%
Atlas Twin-arc Weatherometer Test: no change after 40 hours.

EXAMPLE 2

The composition and procedure of Example 1 were repeated with some exceptions, the principal exception being the elimination of diol and the use of the "head start" technique, wherein IPDI (component K) is added before 2,4-TDI (component J).

Thus, in this Example:

a. A poly(oxypropylene) triol of 6700 molecular weight ("Pluracol" 380) was substituted for components A & B.
b. Mineral spirits were substituted for component E.
c. The substantially neutral calcium carbonate filler was a low oil absorption ground limestone which was slightly coarser, 90% -1200 mesh (U.S.).
d. Component F was added in two increments: 0.16 part was added to the polyol-containing mixture along with component K (IPDI) and 0.11 part was added after formation of the prepolymer.
e. After an exotherm of 4° F. had been observed (resulting from the reaction of the polyol and component K), component J was added in an amount equal (by weight) to the amount of component K, these amounts being set to provide an NCO/OH ratio of 2.24:1.
f. After the completion of the reaction between the polyol and the polyisocyanates, N,N' dimethyl piperazine blended with n-butyl alcohol was added. The amount of butyl alcohol was sufficient to lower the isocyanate functionality of the prepolymer to 2.8.

After coating and curing as in Example 1, a 65 mil thickness of unsupported elastomeric film was found to have a tensile strength at break of 130 psi and an elongation of 1000%. Thus, similar results were obtained with this Example without resorting to a blend of triol and diol. The elastomeric film supports combustion very poorly and does not appear to be a significant fire hazard.

What is claimed is:

1. A process for making a one-part, moisture-reactive composition comprising a moisture-reactive isocyanate-terminated polyether-urethane prepolymer, said process comprising the steps of:

a. providing an isocyanate-reactive composition comprising: an alkaline earth metal oxide, wherein the metal has an atomic weight ranging from 40 to 138, a catalyst for isocyanate/active hydrogen reations, and a liquid polyol composition having an average equivalent weight greater than 1000 and an average functionality greater than 2, said polyol containing at least one polyoxyalkylene chain; the amounts of alkaline earth metal oxide being greater than the stoichiometric amount for reacting with all the water in said isocyanate-reactive composition;

b. exothermically reacting an aliphatic polyisocyanate, at least one of the free isocyanate radicals of said aliphatic polyisocyanate being substantially kinetically more reactive with respect to active hydrogen than any other said free isocyanate radicals;

c. after at least 25% of said free isocyanate radicals of said aliphatic polyisocyanate have reacted with said isocyanate-reactive composition, exothermically reacting said isocyanate-reactive composition with an aromatic polyisocyanate, at least one of the free isocyanate radicals of said aromatic polyisocyanate being substantially kinetically more reactive with respect to active hydrogen than any other said free isocyanate radicals of said aromatic polyisocyanate, the amounts of polyisocyanate being controlled such that the ratio of aromatic NCO equivalents to aliphatic NCO equivalents reacted with said isocyanate-reactive composition is at least about 1:1 but less than 7:1 and the NCO/OH ratio for the entire moisture curable composition is greater than about 1.8:1 but no more than about 3:1; whereby a moisture-reactive isocyanate-terminated polyurethane prepolymer composition having an average NCO functionality greater than 1.8 but less than 3.0 is obtained as a result of steps (b) and (c), said isocyanate-terminated prepolymer composition, upon the addition of a curing catalyst for the isocyanate/water reaction, being curable under normal ambient conditions to a solid elastomer, which, in the form of a sheet-like article, has a tensile strength at break greater than 25 psi and an elongation at break greater than 200%;

d. applying said moisture-reactive isocyanate-terminated polyurethane prepolymer composition to a substrate and curing said composition.

2. A process according to claim 1, wherein:

e. said alkaline earth metal oxide consists essentially of calcium oxide and the amount of said alkaline earth oxide is in excess of the stoichiometric amount for 0.1% by weight of water, based on the weight of said isocyanate-reactive composition; said isocyanate-reactive composition further comprises at least one additional ingredient selected from the group consisting of a filler and a pigment; and said catalyst for isocyanate/active hydrogen reactions is an organo-metallic catalyst for at least the NCO/OH reaction;

f. said aliphatic polyisocyanate is a cycloaliphatic diisocyanate having one substantially sterically unhindered free isocyanate radical and one relatively sterically hindered free isocyanate radical;

g. said aromatic polyisocyanate is an aromatic diisocyanate having 1 or 2 benzene rings one substantially sterically unhindered free isocyanate radical and one relatively sterically hindered free isocyanate radical, the molar ratio of said aromatic diisocyanate to said aliphatic diisocyanate being at least about 2:1 but less than about 6:1; the NCO/OH ratio for the entire moisture curable composition ranging from about 2:1 to about 2.5:1; and h. subsequent to the formation of said isocyanate-terminated polyetherurethane prepolymer composition according to said step (c) but before the curing thereof, a curing catalyst for at least the isocyanate/water reaction is added to provide a one-part composition which is moisture-curable at normal ambient temperatures.

3. A process according to claim 2 wherein said curing catalyst comprises an organo-metallic compound and tertiary amine.

4. A process according to claim 1 wherein said polyol composition comprises at least one polyoxyalkylene triol and has a hydroxyl functionality less than 4 and wherein the average isocyanate functionality of the said isocyanate-terminated polyetherurethane prepolymer is adjusted to less than 3.0 but greater than 2.0 with a monofunctional alcohol during said step (h) by blending said monofunctional alcohol with said curing catalyst.

5. A process according to claim 4 wherein said polyol composition has an average hydroxyl functionality greater than 2.0 but less than 3.0.

6. A process according to claim 2 wherein said applying step (d) comprises coating the product resulting from step (h) onto a substrate to a thickness of 1 – 200 mils and gelling the resulting coating with atmospheric moisture in less than 24 hours under normal ambient temperature conditions, with substantial release of the resulting carbon dioxide prior to completion of the gelling, whereby a substantially non-cellular elastomeric coating is obtained.

7. A process according to claim 6 wherein said substrate is the roof of a building.

8. A process for making a moisture-curable polyurethane coating composition having a viscosity less than 800,000 centipoise at 25° C. and containing an organo-tin/tertiary amine moisture cure catalyst, said process comprising the steps of:

a. blending, at normal ambient temperatures, the components comprising: (1) a liquid polyoxyalkylene polyol component having an average functionality of at least 2.5 but no greater than about 3.0 and an equivalent weight greater than 1000 but less than 3300; (2) a minor amount, by weight, of a particulate solid component containing at least some pigment; (3) an amount of particulate calcium oxide in excess of the amount needed to scavenge all the water in said polyol component and said filler component and to provide an alkaline environment for the resulting blend of components; (4) 0.1–5% by weight of a petroleum distillate which is inert to isocyanate radicals and active-hydrogen-bearing radicals and has a boiling point greater than 30° C. and a measurable vapor pressure at 0° C. under normal atmospheric pressure; and (5) no more than about 80% by weight of the total of the organo-tin component of said organo-tin/tertiary amine catalyst;

b. mixing the resulting blend until the water/calcium oxide reaction is completed and all water in the blend has been scavenged;

c. providing a polyurethane reaction mixture by adding, without the addition of heat, 2/7 to 5/6 NCO equivalents of isophorone diisocyanate per equivalent of polyol active hydrogen and permitting an essentially adiabatic exotherm to develop until the temperature of the resulting mixture indicates that at least 25% of the isocyanate radicals of the isophorone diisocyanate have been converted to urethane linkages;

d. adding, without any further addition of heat, sufficient tolylene diisocyanate to bring said reaction mixture including both reacted and unreacted isophorone diisocyanate, to an NCO/OH ratio of about 2:1 to about 2.5:1, and permitting an additional essentially adiabatic exotherm to develop until substantially all of the free hydroxyl in said reaction mixture has been converted to urethane linkages; said tolylene diisocyanate consisting essentialy of the 2,4-isomer thereof;

e. adding to said reaction mixture: said tertiary amine catalyst component of said organo-tin/tertiary amine moisture-cure catalyst, an amount of monofunctional alcohol sufficient to adjust the isocyanate functionality of the adduct resulting from said reaction mixture to less than 3.0 but greater than about 2.7, and the balance of said organo-tin catalyst component of said organo-tin/tertiary amine moisture catalyst;

f. packaging the resulting product in substantially hermetically sealed containers;

g. coating said resulting product onto a roof for a building at normal ambient temperatures to a thickness of 1–200 mils, and h. curing the coating with atmospheric moisture at normal ambient conditions to an essentially non-cellular elastomeric layer having a tensile strength at break of 50 – 300 psi and an elongation at break of 500 – 2000%.

9. A coated substrate made by the process of claim 1.

10. A process for making a curable polyurethane composition having a viscosity less than 800,000 centipoise at 25° C., comprising the steps of:

a. blending, at normal ambient temperatures, the components comprising (1) a liquid polyoxyalkylene polyol component comprising a triol having an equivalent weight within the range of 1,000 – 3,300 and a diol with an equivalent weight within the range of 1,000 – 5,000; (2) an amount of particulate calcium oxide which is 3 – 1000 times the amount needed to scavenge all the water in said polyol component; (3) up to about 20% by weight of an inert organic liquid diluent having a boiling point in the range of 30° C. – 175° C. and a flash point about 27° C., and (4) 0.03 – 1.0%, based on the weight of said composition, of an organo-metallic catalyst;

b. mixing the resulting blend until the water/calcium oxide reaction is completed and all water in the blend has been scavenged;

c. adding an aliphatic diisocyanate and an aromatic diisocyanate to the resulting mixture, said aliphatic diisocyanate and said aromatic diisocyanate each having one substantially sterically unhindered free isocyanate and one relatively sterically hindered free isocyanate radical, the resulting NCO/OH rato being within the range of about 2:1 to about 2.5:1 and the molar ratio of aromatic diisocyanate to aliphatic diisocyanate being at least 1:1 but less than 7:1; and d. packaging the resulting flowable product in substantially hermetically sealed containers; and e. applying said resulting flowable product to a substate and curing said flowable product.

* * * * *

UNITED STATES PATENT AND TRADEMARK OFFICE
CERTIFICATE OF CORRECTION

PATENT NO. : 4,038,239
DATED : July 26, 1977
INVENTOR(S) : Robert N. Coyner and Peter Skujins It is certified that error appears in the above-identified patent and that said Letters Patent are hereby corrected as shown below:

In Item [73], for "ConTech Inc." read --Contech Inc.--.
In column 2, line 11, for "filters" read --fillers--.
In column 2, line 45, for "polyo" read --polyol--.
In column 4, line 50, for "evaporte" read --evaporate--.
In column 5, line 7, for "20 oxyalkylene" read --20) oxyalkylene--.
In column 6, line 8, for "a s commercially" read --a commercially--.
In column 6, line 14, for "techniques" read --technique--.
In column 6, line 15, for "invention. the" read --invention. The--.
In column 6, line 21, for "alonge" read --alone--.
In column 6, line 40, for "reults" read --results--.
In column 6, line 47, for "effectiverly" read --effectively--.
In column 6, line 49, for "of" read --or--.
In column 7, line 4, for "affects" read --effects--.
In column 7, line 53, for "of" read --on--.
In column 8, line 30, for "stitutent" read --stituent--.
In column 8, line 41, for "Commerically" read --Commercially--.
In column 9, line 28, for "substitutent" read --substituent--.
In column 10, line 12, for "is" read --in--.
In column 11, line 42, for "meausrable" read --measurable--.
In column 11, line 58, for "cycloparffins" read --cycloparaffins--.

UNITED STATES PATENT AND TRADEMARK OFFICE
CERTIFICATE OF CORRECTION

PATENT NO. : 4,038,239
DATED : July 26, 1977
INVENTOR(S) : Robert N. Coyner and Peter Skujins It is certified that error appears in the above-identified patent and that said Letters Patent are hereby corrected as shown below:

In column 11, line 64, for "possiblity" read --possibility--.
In column 12, line 3, for "cotaings" read --coatings--.
In column 12, line 21, for "aicd" read --acid--.
In column 12, line 45, for "ammount" read --amount--.
In column 13, line 4, for "mmixture" read --mixture--.
In column 13, line 9, for "polyol having" read --polyol. For a polyol having--.
In column 13, line 11, for "1,700 0 2,000" read --1,700 - 2,000--.
In column 13, line 18, for "ractions" read --reactions--.
In column 13, line 26, for "excess" read --excessive--.
In column 14, line 32, for "dependingon" read --depending on--.
In column 14, line 67, for "approximateion" read --approximation--.
In column 15, line 4, for "rato" read --ratio--.
In column 15, line 7, for "obtined" read --obtained--.
In column 15, line 39, for "evaportion" read --evaporation--.

UNITED STATES PATENT AND TRADEMARK OFFICE
CERTIFICATE OF CORRECTION

PATENT NO. : 4,038,239
DATED : July 26, 1977
INVENTOR(S) : Robert N. Coyner and Peter Skujins It is certified that error appears in the above—identified patent and that said Letters Patent are hereby corrected as shown below:

<u>Page 3 of 7</u>

In column 15, line 62, for "propolymer" read --prepolymer--.
In column 16, line 37, for "propolymer" read --prepolymer--.
In column 16, line 55, for "propolymer" read --prepolymer--.
In column 16, line 59, for "dimethylpiperazine" read
    --dimethyl piperazine--.
In column 16, line 62, for "solids was" read --solids) was--.
In column 17, line 20, for "40" read --400--.
Delete column 17, line 43 through column 18, line 25, and
    insert the following as Claim 1:

--1. In a process for making a moisture-reactive composition comprising a moisture-reactive isocyanate-terminated prepolymer, which process includes the step of utilizing an alkaline earth metal oxide as a dessicant for at least one of the isocyanate-reactive starting materials for making said isocyanate-terminated prepolymer; said starting materials including a polyoxyalkylene polyol composition having an equivalent weight greater than 1000 and an average functionality greater than 2; the improvement

UNITED STATES PATENT AND TRADEMARK OFFICE
CERTIFICATE OF CORRECTION

PATENT NO. : 4,038,239
DATED : July 26, 1977
INVENTOR(S) : Robert N. Coyner and Peter Skujins It is certified that error appears in the above-identified patent and that said Letters Patent are hereby corrected as shown below:

which comprises:

(a) exothermically reacting aliphatic polyisocyanate with said polyoxyalkylene polyol composition, said aliphatic polyisocyanate being free, except for incidental amounts, of any aliphatic polyisocyanate having at least two free isocyanate radicals on the same molecule which are substantially kinetically equal to each other in their reactivity with respect to active hydrogen;

(b) after at least 25% of the number of equivalents of said aliphatic polyisocyanate have reacted with said polyoxyalkylene polyol composition, exothermically reacting unreacted active hydrogen in said polyoxyalkylene polyol composition with aromatic polyisocyanate, said aromatic polyisocyanate being free, except for incidental amounts. of any aromatic polyisocyanate having at least two free isocyanate radicals in the same molecule which are substantially kinetically equal to each other in their reactivity with respect to active hydrogen, the amounts of

UNITED STATES PATENT AND TRADEMARK OFFICE
CERTIFICATE OF CORRECTION

PATENT NO. : 4,038,239
DATED : July 26, 1977
INVENTOR(S) : Robert N. Coyner and Peter Skujins It is certified that error appears in the above-identified patent and that said Letters Patent are hereby corrected as shown below:

Page 5 of 7 polyisocyanate being controlled such that the ratio of aromatic NCO equivalents to aliphatic NCO equivalents reacted with said isocyanate-reactive composition is at least about 1:1 but less than 7:1 and the NCO/OH ratio for the entire moisture curable composition is greater than about 1.8:1 but no more than about 3:1; whereby a moisture-reactive isocyanate terminated polyurethane prepolymer composition having an average NCO functionality greater than 1.8 but less than 3.0 is obtained as a result of steps (a) and (b) and whereby the yield of a single-unit, polyurethane prepolymer in said polyurethane prepolymer composition is maximized, said prepolymer composition, upon the addition of a curing catalyst for the isocyanate/water reaction, being a one-part system which is curable under normal ambient conditions to a solid which, in the form of a sheet-like article, has a tensile strength at break greater than 25 psi;

(c) applying said moisture reactive isocyanate-terminated polyurethane prepolymer to a substrate and curing said prepolymer.--

UNITED STATES PATENT AND TRADEMARK OFFICE
CERTIFICATE OF CORRECTION

PATENT NO. : 4,038,239
DATED : July 26, 1977
INVENTOR(S) : Robert N. Coyner and Peter Skujins It is certified that error appears in the above–identified patent and that said Letters Patent are hereby corrected as shown below:

Page 6 of 7

In column 18, insert the following between lines 25 and 26:

--2. A process according to claim 1, which includes:
    (d) adding a catalyst for isocyanate/active hydrogen reactions to said isocyanate-reactive composition.--

In column 18, line 26, for "2." read --3.--.
In column 18, line 43, for "rings one" read --rings, one--.
In column 18, line 53, for "(c)" read --(b)--.
In column 18, line 58, for "3." read --4.--.
In column 18, line 61, for "4." read --5.--; for "1" read --2--.
In column 19, line 1, for "5." read --6.--.
In column 19, line 4, for "6." read --7.--.
In column 19, line 5, for "(d)" read --(c)--.
In column 19, line 13, for "7." read --8.--.
In column 19, line 15, for "8." read --9.--.
In column 20, line 3, for "sentialy" read --sentially--.
In column 20, line 23, for "9." read --10.--.
In column 20, line 24, for "10." read --11.--.

UNITED STATES PATENT AND TRADEMARK OFFICE
CERTIFICATE OF CORRECTION

PATENT NO. : 4,038,239
DATED : July 26, 1977
INVENTOR(S) : Robert N. Coyner and Peter Skujins It is certified that error appears in the above-identified patent and that said Letters Patent are hereby corrected as shown below:

In column 20, line 38, for "about" read --above--.
In column 20, line 49, for "rato" read --ratio--.
In column 20, line 57, for "state" read --strate--.

Signed and Sealed this

Twenty-third Day of May 1978

[SEAL]

Attest:

RUTH C. MASON
Attesting Officer

LUTRELLE F. PARKER
Acting Commissioner of Patents and Trademarks